(12) United States Patent
Chapman

(10) Patent No.: US 6,466,592 B1
(45) Date of Patent: Oct. 15, 2002

(54) MPEG FRAME ADD/DROP MULTIPLEXER WITH BANDWIDTH CONTROLLER

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/184,784

(22) Filed: Nov. 2, 1998

(51) Int. Cl.[7] .................................................. H04J 3/04
(52) U.S. Cl. ....................................................... 370/537
(58) Field of Search ................................. 370/537, 535, 370/503, 507, 508, 516, 521, 477, 538, 480, 252, 254, 229, 465, 337, 351, 352; 375/371, 362; 348/426, 385, 465; 709/240, 247; 380/212, 217, 239, 269

(56) References Cited

U.S. PATENT DOCUMENTS 6,148,082 A * 11/2000 Slattery et al. ............. 370/474
6,246,701 B1 * 6/2001 Slattery ...................... 370/507
6,292,490 B1 * 9/2001 Gratacap et al. ............ 370/535

* cited by examiner

Primary Examiner—Dang Ton
(74) Attorney, Agent, or Firm—Marger Johnson & McCollom, PC

(57) ABSTRACT

An add/drop multiplexer in a cable network multiplexes data from different sources together on a common cable television channel without corrupting MPEG time stamps. An idle insertion circuit coupled to a first data source inserts, if necessary, a selectable guaranteed minimum number of idle frames into a first bit stream. If the number of naturally occurring idle frames is above the guaranteed minimum number, the idle insertion circuit does not force idle frames into the first bit stream. A multiplexer is coupled between the idle insertion circuit and a second data source and replaces data with idles in the first bit stream from the second data source. The idles inserted into the bit stream are used to control the amount of bandwidth allocated to the second data source.

39 Claims, 7 Drawing Sheets

MPEG FRAME ADD/DROP MULTIPLEXER WITH BANDWIDTH CONTROLLER

BACKGROUND OF THE INVENTION

This invention relates to an MPEG multiplexer and more specifically to a system that multiplexes MPEG frames from different sources onto a common channel in a cable network.

Cable networks are used to deliver the Internet into remote subscriber sites such as a home or office over cable TV links. A cable TV company central location is referred to as a head end. The head end broadcasts data over the cable network to the remote subscriber sites. A cable modem at the remote subscriber site converts data on the TV channel into Ethernet packets that are sent over a Local Area Network (LAN) to a personal computer or server in the home or office.

One problem with transmitting Internet data over cable networks is that data from separate Internet sources must be broadcast on separate TV channels. Because there are only a limited number of available cable TV channels, broadcasting internet data on separate TV channels reduces the number of television programs that the cable company can provide in turn reducing cable company revenues. The cable modems at the subscriber sites are also expensive because each cable modem must demodulate data from multiple TV channels.

Motion Picture Experts Group 2 (MPEG 2) frames are used for sending digital data, video or audio over the cable network. MPEG 2 frames include a packet identifier that identifies the source of the frame and a payload that contains the data, video or voice. The MPEG-2 bit stream also includes time stamps that synchronize circuitry on opposite ends of the cable network. In MPEG 2, the video and audio data are transmitted in separate MPEG bit streams that must arrive at subscriber sites at the same time. If either MPEG bit stream is delayed as a result of being buffered or multiplexed with other data, the timing relationship between the video bit stream and the associated audio bit stream is corrupted. If the time stamp is buffered or delayed from its original time reference, circuitry on opposite ends of the cable network becomes unsynchronized and can corrupt data in the bit stream. It is, therefore, very difficult to multiplex data from separate data sources onto the same MPEG bit stream.

Accordingly, a need remains for multiplexing data from different sources onto a common channel on a cable network.

SUMMARY OF THE INVENTION

An add/drop multiplexer is used in a cable network to multiplex data from different sources together on a common cable television channel while guaranteeing allocation of a minimum amount of bandwidth to each one of multiple data sources. The add/drop multiplexer is defined as a preconditioning circuit, MPEG idle detect circuit and multiplexer that both preconditions a first MPEG bit stream and then combines data from a second source into the preconditioned MPEG bit stream. The percentage of bandwidth allocated to each source is controlled by preconditioning a first MPEG bit stream before being multiplexed with a second MPEG bit stream. A first data source from a cable television head end normally broadcasts a first bit stream over the cable link to cable modems at remote subscriber locations. The cable modems convert the data broadcast on a cable TV channel into network packets that are sent to computers in the subscriber home or office. A second data source has packet data that also must be broadcast data over the cable link.

The add/drop multiplexer is coupled to the first data source and if necessary preconditions the first bit stream by inserting idle frames. The add/drop multiplexer determines when a predetermined number of MPEG frames have occurred in the first MPEG bit stream. If a minimum number of idle frames have occurred naturally, no idle frames are forced into the first MPEG bit stream by the add/drop multiplexer. If the number of naturally occurring idle frames is below the minimum number, the idle add/drop multiplexer forces a minimum number of idle frames into the MPEG bit stream that corresponds with a minimum bandwidth allotment for the second data source.

Before inserting idle frames, the add/drop multiplexer determines whether a time stamp exists in a next one of the MPEG frames in the first bit stream. An idle is inserted as the next one of the MPEG frames when the predetermined number of frames have occurred and the next frame is not a time stamp. If the next frame contains a time stamp, the add/drop multiplexer inserts the idle frame after the time stamp. Thus, the add/drop multiplexer will not corrupt time stamps in the first bit stream.

The add/drop multiplexer then multiplexes data from the first data source with the data from the second data source by replacing idle frames in the first bit stream with data packets from the second data source. Preconditioning the first bit stream to force a minimum number of idle frames, guarantees the second data source a predetermined amount of bandwidth on the cable network. Thus, the add/drop multiplexer controls bandwidth allocation, allows simple multiplexing circuitry and ensures time stamps are not corrupted.

The foregoing and other objects, features and advantages of the invention will become more readily apparent from the following detailed description of a preferred embodiment of the invention which proceeds with reference to the accompanying drawings.

DETAILED DESCRIPTION

Figure 1:
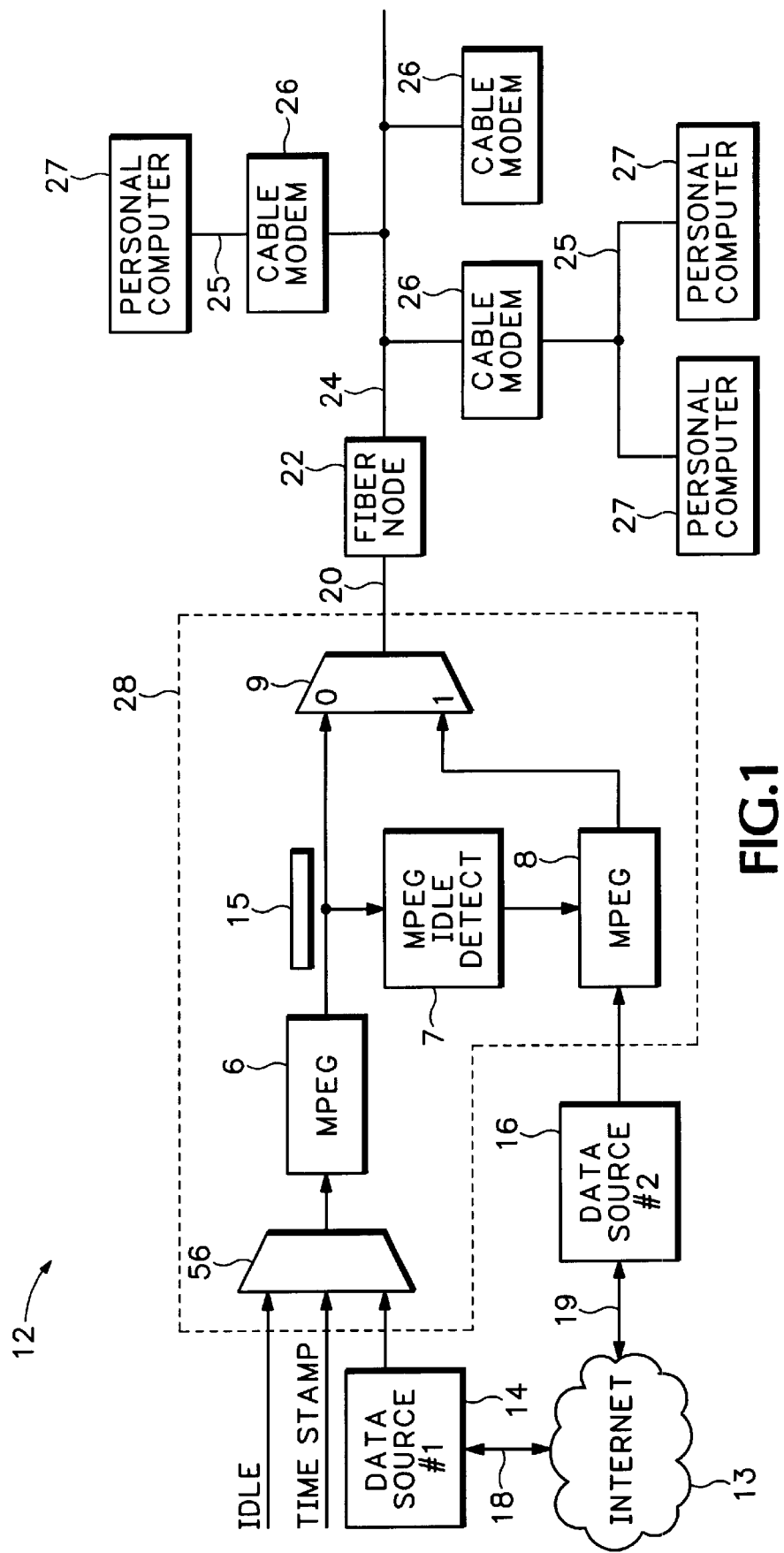
FIG. 1 is diagram of a cable TV network according to the invention.

FIG. 1 shows a cable network 12 that includes a first source 14 and a second source 16. Source 14 is output as a formatted, time sensitive MPEG bit stream 15. The second source 16 represents a data source that may be delayed and manipulated. The first source 14 is typically a computer system, router, switch, etc., located at a cable television station head end. The second source 16 is typically a computer system or router.

The source 14 might be coupled through a network link 18 to an Internet network 13. Source 16 might also be coupled by a network link 19 to the Internet 13. An add/drop multiplexer 28 multiplexes data from sources 14 and 16 onto a television channel and sends the modulated data over an optical fiber cable 20 to a fiber node 22. The fiber node 22 converts data on the optical fiber cable 20 to a coaxial cable (coax) 24. The coax 24 is connected to multiple cable modems 26. The cable modems 26 are typically located in homes or offices and demodulate the TV signal into digital Ethernet packets that are sent over a LAN 25 to one or more Personal Computers (PCs) 27. The add/drop multiplexer is defined as a preconditioning circuit 56, MPEG idle detect circuit 7 and multiplexer 9 that preconditions a first MPEG bit stream 15 and then combines data from the second source 16 into the preconditioned MPEG bit stream 15. The add/drop multiplexer 28, according to the invention, is referred to generally as MUX 28. The MUX 28 allows both source 14 and source 16 to broadcast data on the same TV channel in the cable network 12 and guarantees a portion of the channel bandwidth to each source. An MPEG bit stream 15 coming from the MPEG source 6 is preconditioned by an idle insertion circuit 56 that guarantees a minimum number of idle frames. This guarantees the source 16 a minimum amount of bandwidth on the cable network 20. The idle insertion circuit 56 also prevents corruption of time stamps in the MPEG bit stream 15.

The idle frames in MPEG bit stream 15 are used by an idle detection circuit 7 in the add/drop multiplexer 28 to control when MPEG frames from source 16 are output from MPEG source 8. MPEG frames generated from data source 16 are output during idle frames in MPEG bit stream 15. Since idle insertion circuit 56 preconditioned the bit stream 15 to guarantee a minimum number of idle frames, data source 16 is guaranteed a minimal amount of bandwidth on network 20.

Figure 2:
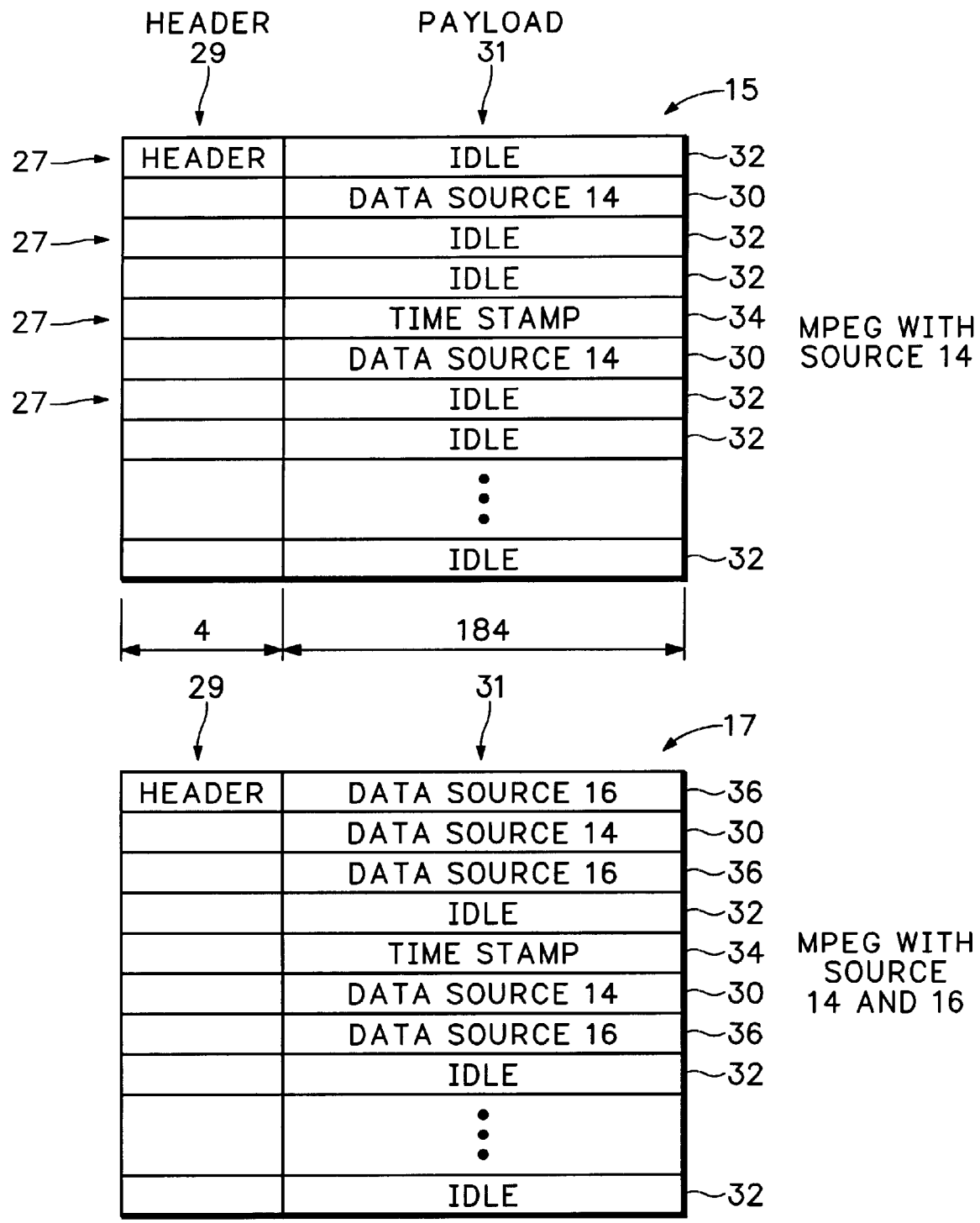
FIG. 2 is a diagram of an MPEG bit stream according to the invention.

Referring to FIG. 2, source 14 outputs data frames 30 in a first MPEG bit stream 15. The MPEG bit stream 15 is defined as a continuous series of 188-byte MPEG frames 27. These frames 27 each consist of a 4-byte header 29, an optional 1-byte pointer field (not present in all packets) and a 183 or 184 byte of payload. The header 27 identifies the type of payload 31 such as a data-over-cable MAC payload 30 or an idle 32. The MPEG header 29 and payload 31 for data over cable are described in further detail in ITU-T H.222.0.

When source 14 has no data to broadcast, idle frames 32 are inserted in the MPEG bit stream 15. If a minimum number of idle frames 32 do not occur naturally, the add/drop multiplexer 28 (FIG. 1) forces a minimum amount of idle frames 32 into the bit stream 15. Time stamps 34 are periodically inserted into the MPEG bit stream 15 for synchronization. The time stamps 34 include an identifier and a counter value representing a time associated with the source 14. The counter value is copied by counters in the cable modems 26 (FIG. 1) at remote subscriber locations to synchronize clocks at opposite ends of the cable network 12.

The add/drop MUX 28 monitors the MPEG bit stream 15 broadcast from source 14. If MPEG source 16 has data to broadcast add/drop MUX 28 (FIG. 1) waits for an idle frame 32 in bit stream 15. The next available idle frame 32 is replaced with a data frame 36 from source 16. MPEG bit stream 17 shows idle frames 32 replaced by data frames 36 from source 16. To prevent corruption of time stamp 34, data frames from source 16 are only inserted over idle frames 32 and are not inserted between MPEG frames or over time stamps 34. Thus, time relationships between time stamps and data in the bit stream is not corrupted.

Bandwidth allocation is controlled for source 16 by controlling the percentage of idle frames 32 in the MPEG bit stream 15. The add/drop mux 28 forces idle frames 32 into the MPEG bit stream 15, if necessary, to ensure a minimum bandwidth for source 16. The source 16 will have additional bandwidth available when more than a minimum number of idle frames 32 naturally occur in the bit stream 15. This occurs when the source 14 has no data to broadcast and sends default idle frames on the bit stream 15. In this situation, the add/drop mux 28 will not force additional idle frames into the bit stream 15.

For example, if 10% of the bandwidth on the MPEG bit stream 15 is allotted to source 16, at least one idle frame is guaranteed for each ten frames in bit stream 15. The source 14 then has available a maximum 90% of the MPEG bit stream 15. Source 16 has available a maximum of 100% (when the source 14 has no data) and a guaranteed minimum 10% of the MPEG bit stream 15.

The add/drop multiplexer 28 guarantees a maximum latency for each source 14 and 16. For example, with a 10% guaranteed minimum bandwidth allocated to source 16, the maximum latency that the source 16 experiences is 9 MPEG frames and the maximum latency the source 14 experiences is 1 MPEG frame. Thus, the invention guarantees both a minimum bandwidth and a maximum latency for source 16.

Figure 3:
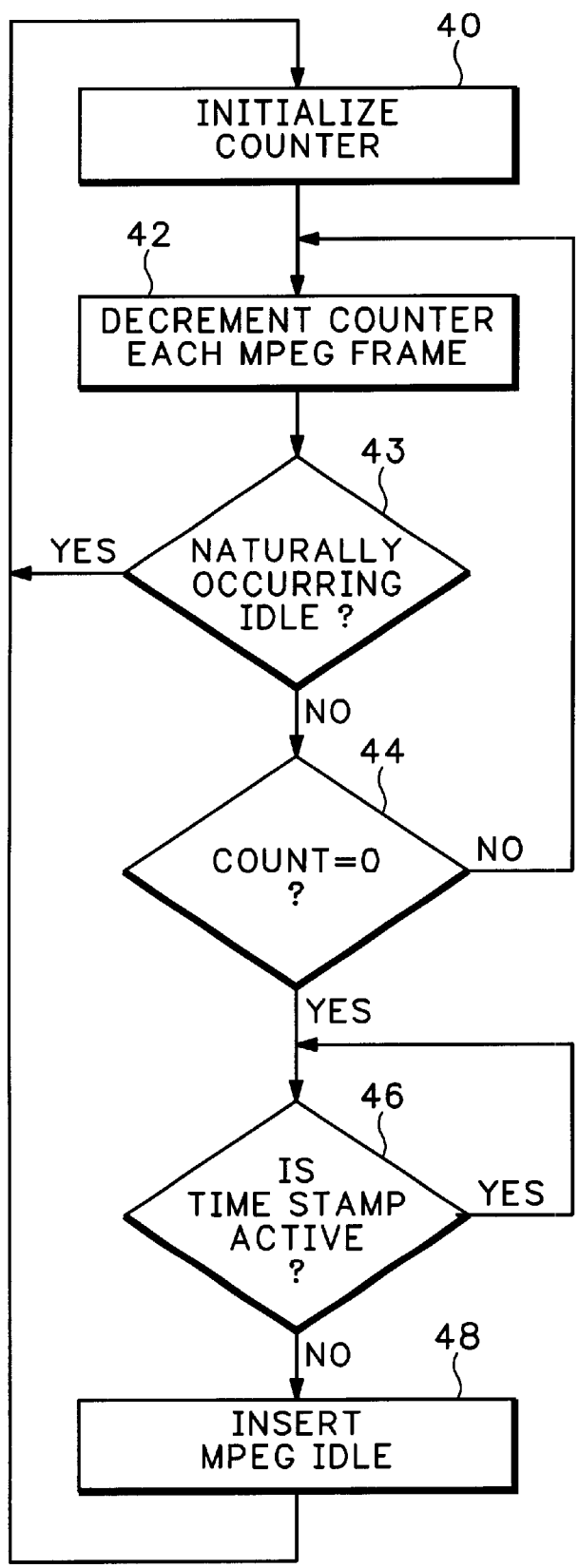
FIG. 3 is a step diagram showing how idle frames are inserted into the MPEG bit stream shown in FIG. 2.

FIG. 3 is a flow diagram showing how the MPEG bit stream 15 is preconditioned before being multiplexed with data from source 16. A counter 94 in source 14 (FIG. 6) is initialized in step 40 to a count threshold value corresponding with a minimum bandwidth allocation for source 16. Each time a MPEG frame is counted, the threshold value is decremented in step 42. If the MPEG frame is a naturally occurring idle frame in decision step 43, the counter is reinitialized in step 40. If the counter does not reach zero in decision step 44, the count threshold value continues to be decremented in step 42. If the counter reaches zero and no naturally occurring idle frames have been detected, the next frame is checked for a time stamp in decision step 46. If no time stamp is detected in decision step 46, an MPEG idle frame is inserted in step 48. When the time stamp exists, decision step 46 inserts the idle frame in the next available MPEG frame after the time stamp.

The count threshold value initialized in step 40 is configurable according to the desired bandwidth and maximum latency assigned to source 16. In the example described above, the count threshold is set to 9 so that the source 16 (FIG. 1) is guaranteed at least one out of every 10 MPEG frames. However, the count threshold can be either increased to reduce the minimum bandwidth allocated to source 16 or decreased to increase the minimum bandwidth allocated to source 16. While only two sources are shown in FIG. 1, multiple sources can each be assigned different thresholds and data from each source multiplexed onto the same TV channel using substantially the same circuitry described below.

Figure 4:
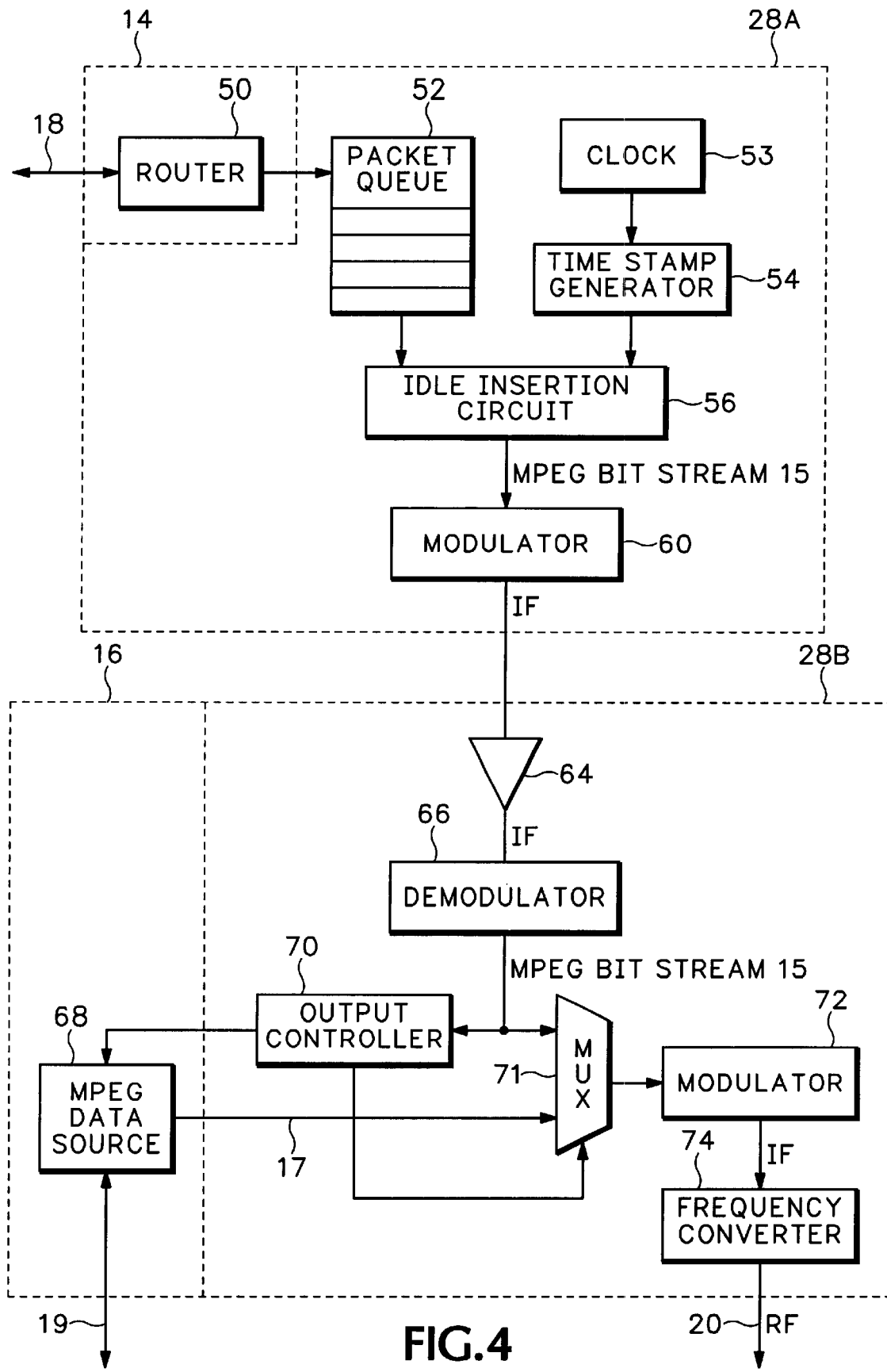
FIG. 4 is a detailed diagram of an MPEG add/drop multiplexer with bandwidth control according to the invention.

FIG. 4 is a detailed block diagram of components located in the source 14 and the source 16 including components used in the add/drop multiplexer 28 shown in FIG. 1. A router 50 is coupled to the network link 18 such as a LAN, WAN or alternatively to an upstream receive path of the cable network 12. The router 50 receives packets over the network link 18 and outputs the packets to a packet queue 52. The router 50 is well known to those skilled in the art and is, therefore, not described in further detail.

A clock 53 generates a time reference value. A time stamp generator 54 formats the time reference value into a time stamp frame. An idle insertion circuit 56 inserts MPEG idle frames into the MPEG bit stream 15 as described in FIG. 3. A modulator 60 modulates the MPEG bit stream 15 onto an Intermediate Frequency (IF). The IF modulated MPEG bit stream 15 is then broadcast to the second source 16.

Source 16 includes an MPEG data source 68 such as a personal computer, network server, router, switch, video source, audio source, etc. The data source 68 can also come from an external system via the LAN or WAN network link 19. An amplifier 64 feeds the IF signal to a demodulator 66 that converts the IF signal back into a digital MPEG bit stream 15. The portion of MUX 28 in source 16 includes an output controller 70 that monitors the bit stream 15 and enables a MUX 71 to replace idle frames in bit stream 15 with data packets from data source 68. A modulator 72 modulates the multiplexed MPEG bit stream output from MUX 71 into an IF signal that is converted into a RF signal by frequency converter 74. The output of frequency converter 74 is broadcast on the cable link 20 to the cable modems 26 at remote subscriber locations (FIG.1). A frequency converter 74 converts the IF frequency into a Radio Frequency (RF) corresponding to a channel on the cable network 12. For a cable network, the RF frequency is somewhere between 54 MegaHertz and 850 MegaHertz.

Figure 5:
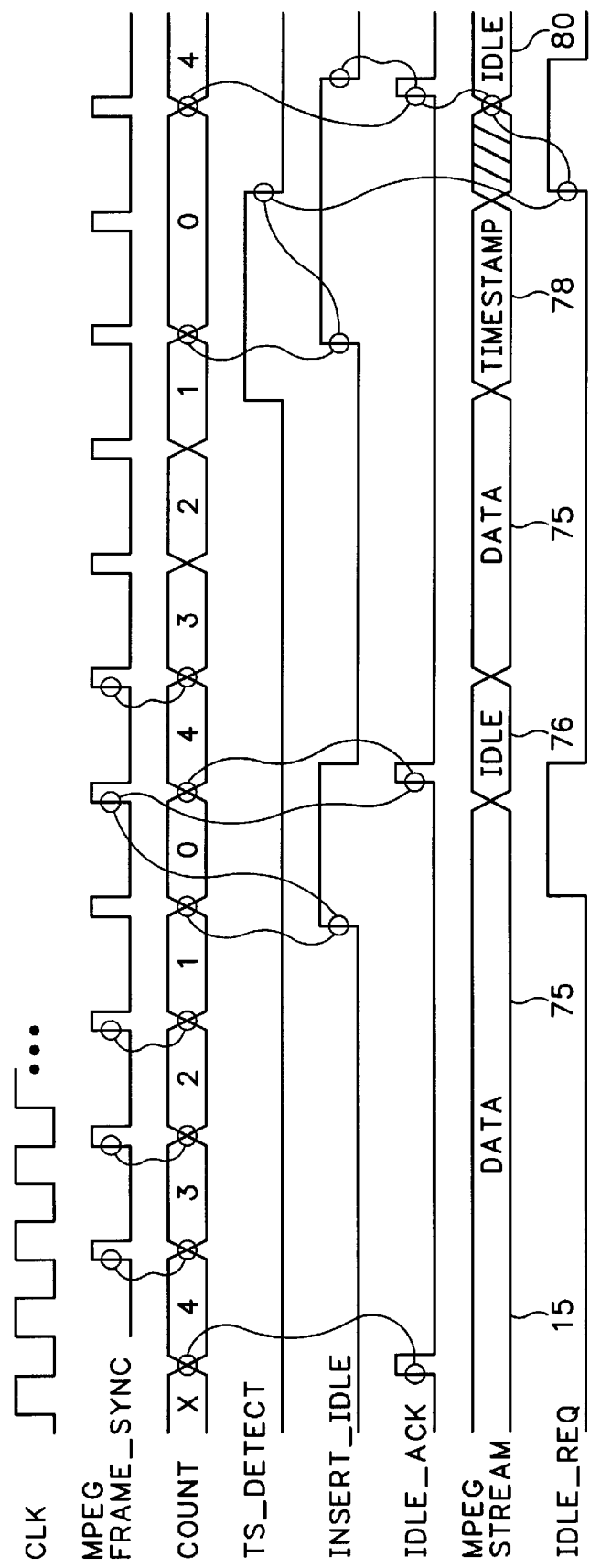
FIG. 5 is a timing diagram showing how the add/drop multiplexer operates.

FIG. 5 is a timing diagram showing an IDLE_ACK signal that initializes a COUNT signal. For illustrative purposes, the MPEG framing is inferred and only the MPEG payload is shown in bit stream 15. A FRAME_SYNC signal indicates an MPEG frame boundary. When the FRAME_SYNC signal is asserted and the IDLE_ACK signal is not asserted, it is assumed that data is being transmitted and the COUNT signal is decremented. An INSERT_IDLE signal is asserted when the COUNT signal reaches zero causing assertion of the IDLE_REQ signal when the TS_DETECT signal is not asserted. The TS_DETECT signal is asserted when a time stamp exists in the MPEG bit stream.

The IDLE_REQ signal requests insertion of an idle frame in the MPEG bit stream. On the next FRAME_SYNC boundary after assertion of the IDLE_REQ signal, an idle frame 76 is added to the MPEG bit stream 15. Insertion of the idle frame 76 causes assertion of the IDLE_ACK signal causing the COUNT signal to reload to four. The completion of the idle frame 76 causes the COUNT signal to decrement to three. Each subsequent assertion of the FRAME_SYNC signal causes the COUNT signal to decrement until the counter again reaches zero.

The INSERT_IDLE signal is again asserted when the COUNT signal reaches zero. Because a time stamp 78 now exists in bit stream 15, the TS_DETECT signal is asserted. The IDLE_REQ signal is not asserted until TS_DETECT is deasserted. When the TS_DETECT signal is finally deasserted, the IDLE_REQ signal is asserted allowing insertion of an idle frame 80 in the bit stream 15 on the next FRAME_SYNC pulse. The IDLE_ACK signal is then asserted causing the INSERT_IDLE signal to be deasserted and the COUNT signal to be reloaded to four.

Figure 6:
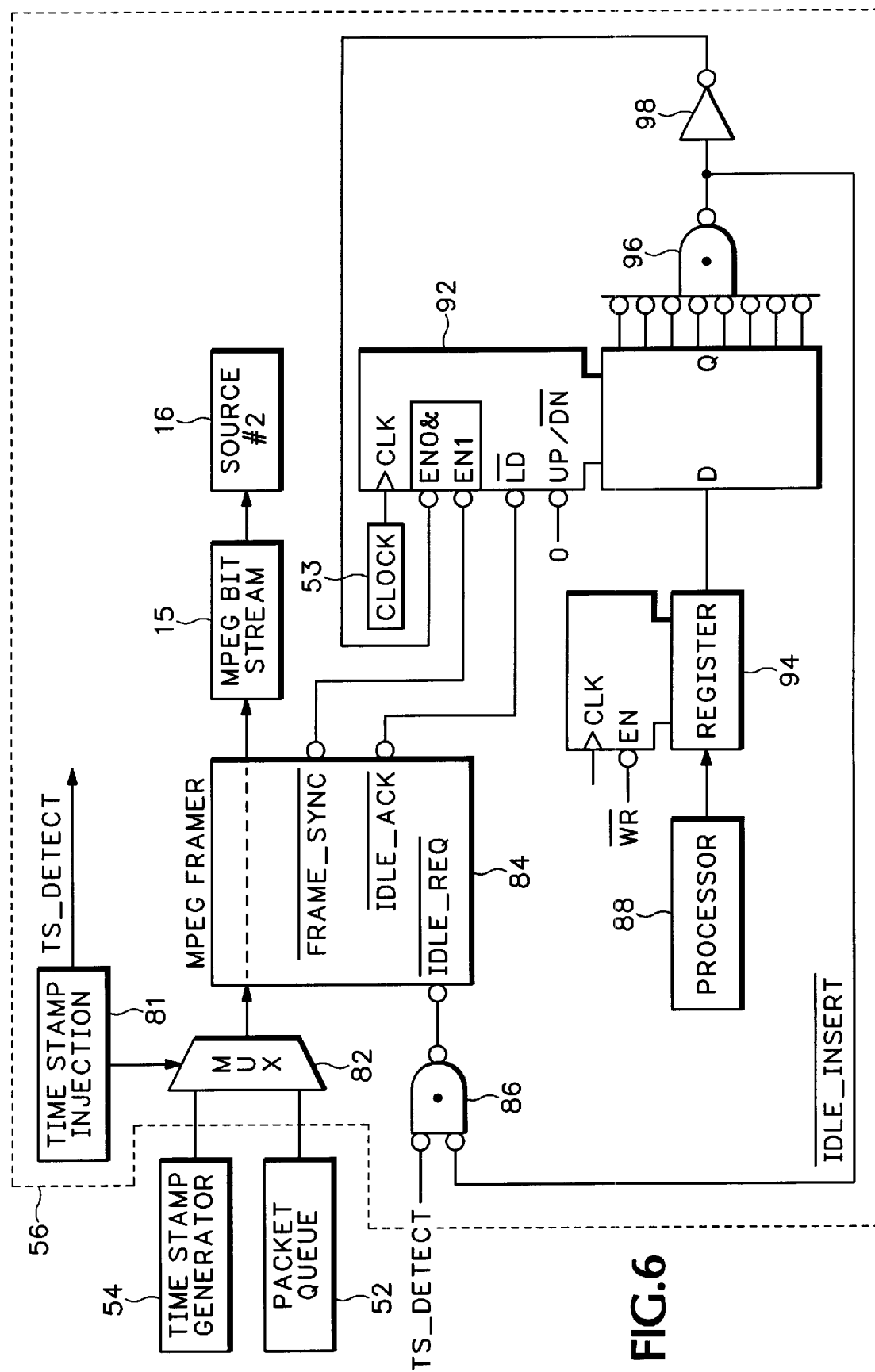
FIG. 6 is a detailed diagram of an idle insertion circuit used with the add/drop multiplexer.

FIG. 6 is a detailed diagram of the idle insertion circuit 56 shown in FIG. 4. The time stamp generator 54 and the packet queue 52 feed a multiplexer 82 controlled by a time stamp injection circuit 81. The time stamp injection circuit 81 includes a timer (not shown) that controls when time stamps are inserted into MPEG bit stream 15. The MUX 82 is switched to receive the output of the time stamp generator 54 whenever the timer indicates a time stamp should be inserted in the bit stream 15. After the time stamp is inserted in the MPEG bit stream 15, the time stamp injection circuit 81 switches the MUX 82 back to outputting from the packet queue 52. An MPEG framer 84 receives data packets and time stamps from MUX 82 and generates the MPEG bit stream 15.

The circuitry in time stamp injection circuit 81 and MPEG framer 84 is generally known except that the MPEG framer 84 is now modified to precondition the MPEG bit stream 15 with a selectable number of idle frames. The MPEG framer 84 generates the IDLE_ACK signal that enables a counter 92 to load a preset COUNT value from a register 94. The present COUNT value in register 94 is selectable via a processor 88. Every time a FRAME_SYNC pulse is generated by MPEG framer 84, the counter 92 decrements the preset value by one. When the counter 92 counts down to zero, the IDLE_INSERT signal is asserted from a NAND gate 96 to gate 86. The IDLE_INSERT signal is masked by the TS_DETECT signal asserted by the time stamp injection circuit 81 when a time stamp frame exists in the MPEG bit stream 15. When the time stamp no longer exists, the IDLE_REQ signal is unmasked causing the MPEG framer 84 to insert an idle frame into the MPEG bit stream 15 on the next FRAME_SYNC boundary. The MPEG framer 84 then asserts the IDLE_ACK signal.

Figure 7:
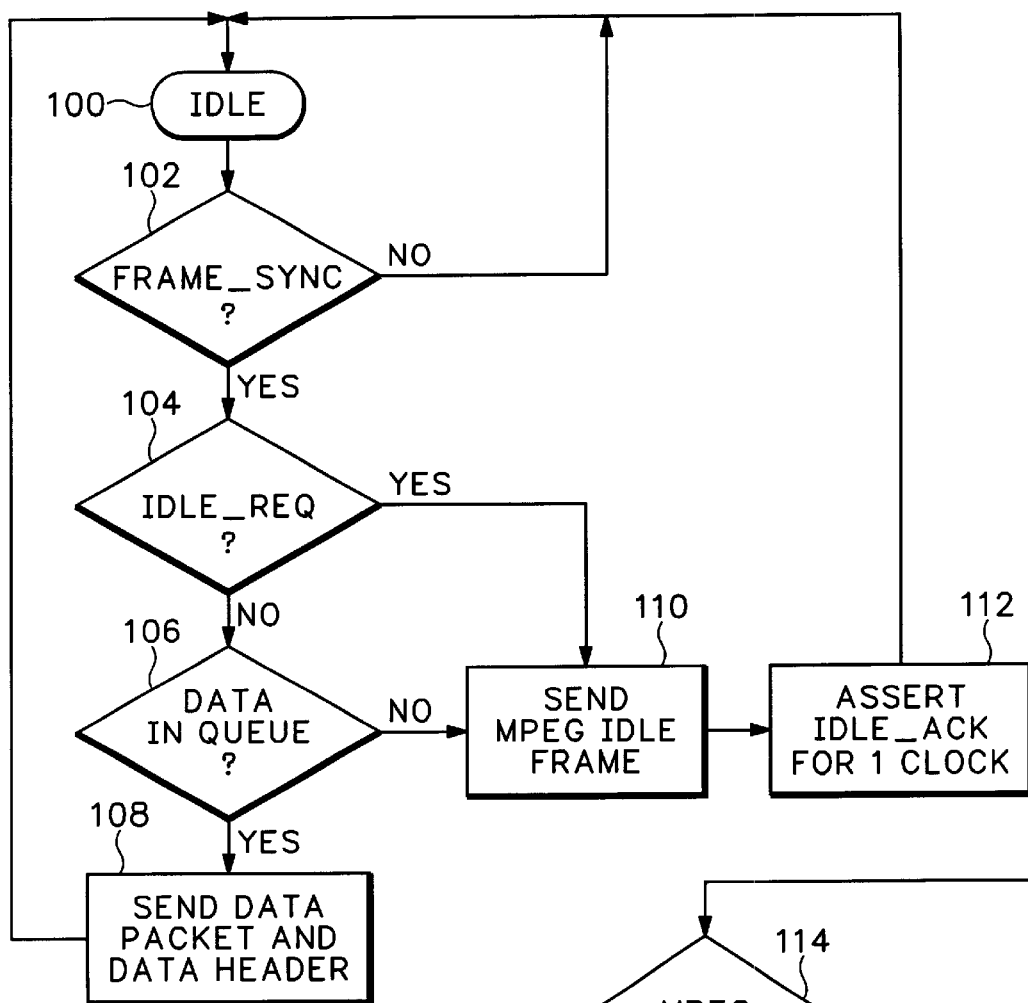
FIG. 7 is a step diagram showing how the idle insertion circuit operates.

FIG. 7 is a detailed step diagram showing further how the idle insertion circuit 56 in FIG. 6 operates. The MPEG framer state machine idles in step 100. If no FRAME_SYNC signal is asserted, the state machine continues to idle in decision step 102. If a FRAME_SYNC signal is asserted, an IDLE_REQ is not asserted in decision step 104 and there is a data packet in the packet queue in decision step 106, step 108 sends the data packet and associated data header out on the MPEG bit stream 15. The state machine then goes back into an idle state in step 100 and waits for the next FRAME_SYNC signal. If the IDLE_REQ is asserted (TS_DETECT not asserted) or there is no data in the packet queue 52, step 110 inserts the MPEG idle frame on the next frame boundary of the MPEG bit stream 15 and step 112 asserts and IDLE_ACK signal for 1 clock. The state machine then goes back to the idle state in step 100.

Figure 8:
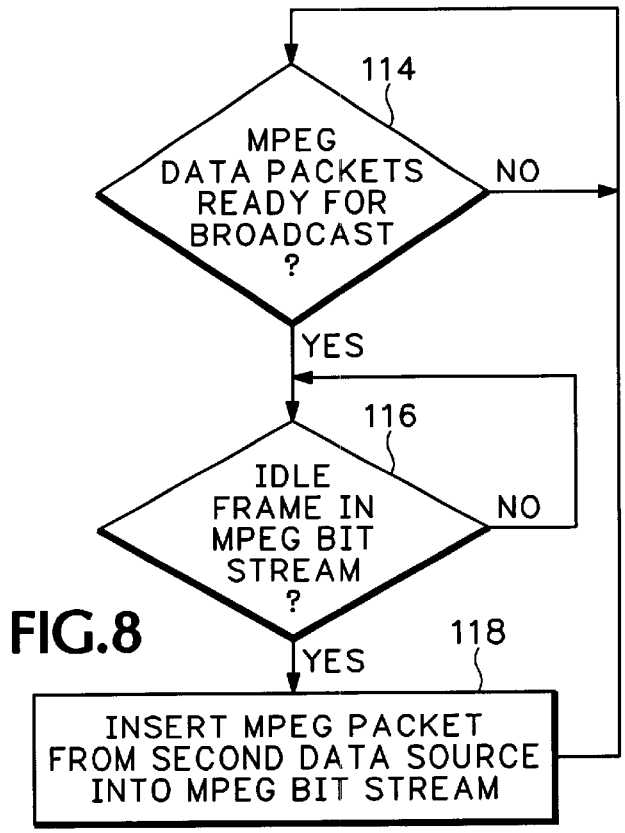
FIG. 8 is a step diagram showing how data from a second data source in multiplexed with data from a first data source in the add/drop multiplexer.

FIG. 8 is a step diagram showing how the output controller 70 and MUX 71 in FIG. 4 operate. The output controller in decision step 114 checks the second MPEG data source to determine whether there are any data packets ready for inserting in the MPEG bit stream 15. If there are available data packets, decision step 116 waits for the next idle frame in bit stream 15. When an idle frame is finally detected, the output controller 70 switches the MUX in step 118 to insert the data packet from data source 68 onto the MPEG bit steam 15. The output controller 70 then jumps back to decision step 114 and determines whether another data packet exists in data source 68.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A circuit for combining bit streams from different sources onto a common channel in a cable network, comprising:

a multiplexer having a first input receiving a first bit stream from a first data source with a selectable guaranteed minimum percentage of idles, a second input receiving data from a second source, and an output generating a multiplexed bit stream from the first and second source onto a common channel on the cable network; and an output controller monitoring the first bit stream and enabling the multiplexer to insert data from the second source over idles detected in the first bit stream, the selectable minimum percentage of idles in the first bit stream providing the second source with a guaranteed minimum bandwidth for broadcasting data on the cable network.

2. A circuit according to claim 1 wherein the multiplexed bit stream is and formatted into MPEG frames.

3. A circuit according to claim 1 wherein the first source comprises a head end and the second source comprises an MPEG data source each broadcasting over the cable network.

4. A circuit according to claim 3 wherein the cable network includes a cable link broadcasting the multiplexed bit stream to multiple cable modems at remote subscriber locations.

5. A circuit according to claim 1 wherein the first bit stream includes MPEG time stamps, data packets and idles, the idles inserted at predetermined minimum time periods when no time stamps exist in the first bit stream or when there are no data packets are available from the first source and no time stamps exist in the first bit stream.

6. A circuit according to claim 1 including an idle insertion circuit that inserts the selectable minimum percentage of idles into the first bit stream.

7. A circuit for combining bit streams from different sources onto a common channel in a cable network, comprising:

a multiplexer having a first input receiving a first bit stream from a first data source with a selectable guaranteed minimum percentage of idles, a second input receiving data from a second source, and an output generating a multiplexed bit stream from the first and second source onto a common channel on the cable network;

an output controller monitoring the first bit stream and enabling the multiplexer to insert data from the second source over idles detected in the first bit stream, the selectable minimum percentage of idles in the first bit stream providing the second source with a guaranteed minimum bandwidth for broadcasting data on the cable network; and an idle insertion circuit that inserts the selectable minimum percentage of idles into the first bit stream, wherein the idle insertion circuit includes the following:

an MPEG framer receiving both time stamps from a time stamp generator and data packets from a packet queue and outputting the first bit stream;

a counter circuit coupled to the MPEG framer for counting frames in the first bit stream and initiating the MPEG framer to insert a predetermined number of idles in the first bit stream; and a masking circuit coupled between the counter and the MPEG framer preventing the MPEG framer from inserting idles when time stamps occur in t first bit stream.

8. A circuit according to claim 7 including a register for loading a selectable idle number into the counter.

9. A circuit according to claim 7 including a multiplexer coupling one of the time stamp generator and the packet queue to the framer, according to occurrences of time stamps in the first bit stream.

10. A preconditioning circuit for generating a bit stream on a cable network, comprising:

a packet queue containing data packets from a data source;

a time stamp generator generating time stamps establishing time references in the bit stream;

an idle insertion circuit coupled to both the packet queue and the time stamp generator that generates the bit stream by combining the data packets with the time stamps while guaranteeing a selectable minimum number of idle frames.

11. A preconditioning circuit for generating a bit stream on a cable network, comprising:

a packet queue containing data packets from a data source;

a time stamp generator generating time stamps establishing time references in the bit stream; and an idle insertion circuit coupled to both the packet queue and the time stamp generator that generates the bit stream by combining the data packets with the time stamps while guaranteeing a selectable minimum number of idle frames, wherein the idle insertion circuit includes the following:

a framer coupled to both the time stamp generator and the data queue and outputting a bit stream;

a counter coupled to the framer; and a masking circuit coupled between the counter and the framer preventing the framer from inserting the idle frames over the time stamps.

12. A preconditioning circuit according to claim 10 including the following:

a modulator for modulating the bit stream into an intermediate frequency; and a frequency converter for converting the intermediate frequency into a cable TV channel frequency.

13. A preconditioning circuit according to claim 12 including a cable TV link coupled to the idle insertion circuit for carrying the bit stream to multiple cable modems in remote cable TV subscriber locations.

14. A preconditioning circuit according to claim 11 including the following:

a multiplexer multiplexing data packets from a second data source with the bit stream from the idle insertion circuit; and a data output controller monitoring the bit stream from the idle insertion circuit and enabling the second source to output data through the multiplexer when idles appear in the bit stream.

15. A cable network, comprising:

a first data source generating a first bit stream;

a second data source generating data packets;

a cable link coupling the first data source to the second data source;

an idle insertion circuit coupled to the first data source that inserts a minimum number of idle bits into the first bit stream;

a multiplexer circuit coupled between the idle insertion circuit and the second data source replacing idle bits in the first bit stream with data packets from the second data source, the minimum number of idle bits guaranteeing the second data source a minimum amount of bandwidth on the cable network.

16. A cable network according to claim 15 wherein the multiplexer generates an MPEG bit stream broadcast over the same TV channel on the cable link.

17. A cable network according to claim 16 wherein the idle insertion circuit is programmable to selectively vary the minimum bandwidth allocated to the second source.

18. A method for multiplexing multiple MPEG bit streams onto a common TV channel in a television cable network, comprising:

counting occurrences of MPEG frames in an MPEG bit stream;

identifying when a predetermined number of the MPEG frames have occurred in the MPEG bit stream;

detecting whether a time stamp exists in a next MPEG frame in the MPEG bit stream;

inserting an MPEG idle frame into the next MPEG frame when the predetermined number of MPEG frames have occurred and the time stamp is not detected; and replacing idle frames in the MPEG bit stream with data packets from a second data source thereby forming a multiplexed MPEG bit stream and guaranteeing the second source a guaranteed portion of the multiplexed MPEG bit stream.

19. A method according to claim 18 including inserting the MPEG idle frame after the next MPEG time frame when the time stamp is the next MPEG time frame.

20. A method for multiplexing multiple MPEG bit streams onto a common TV channel in a television cable network, comprising:

counting occurrences of MPEG frames in an MPEG bit stream;

identifying when a predetermined number of the MPEG frames have occurred in the MPEG bit stream;

detecting whether a time stamp exists in a next MPEG frame in the MPEG bit stream;

inserting an MPEG idle fame into the next MPEG frame when the predetermined number of MPEG frames have occurred and the time stamp is not detected;

replacing idle frames in the MPEG bit stream with data packets from a second data source thereby forming a multiplexed MPEG bit stream and guaranteeing the second source a guaranteed portion of the multiplexed MPEG bit stream;

inserting the MPEG idle frame after the next MPEG time frame when the time stamp is the next MPEG time frame;

modulating the multiplexed MPEG bit stream onto a TV channel;

transmitting the modulated MPEG bit stream on the cable television network to multiple cable modems at remote subscriber locations;

demodulating the modulated MPEG bit stream at the subscriber locations;

sending the demodulated MPEG bit stream from the first source and demodulated data packets from the second source over a LAN to a personal computer.

21. An electronic storage medium containing computer executable software for multiplexing multiple bit streams onto a common channel in a television cable network, comprising:

code for counting occurrences of frames in a bit stream;

code for identifying when a predetermined number of the frames have occurred in the bit stream;

code for detecting whether a time stamp exists in a next frame in the bit stream;

code for inserting an idle frame into the next frame when the predetermined number of frames have occurred and the time stamp is not detected; and code for replacing idle frames in the bit stream with data packets from a second data source thereby forming a multiplexed bit stream and guaranteeing the second source a guaranteed portion of the multiplexed bit stream.

22. An electronic storage medium according to claim 21 including code for inserting the idle frame after the next frame when the next frame contains the time stamp.

23. An electronic storage medium according to claim 21 including:

code for modulating the multiplexed bit stream onto a channel;

code for transmitting the modulated bit stream on the television cable television network to multiple cable modems at remote subscriber locations;

code for demodulating the modulated bit stream at the subscriber locations; and code for sending the demodulated bit stream from the first source and demodulated data packets from the second source to an endpoint.

24. A system for multiplexing multiple bit streams onto a common channel in a television cable network, comprising:

means for counting occurrences of frames in a bit stream;

means for identifying when a predetermined number of the frames have occurred in the bit stream;

means for detecting whether a time stamp exists in a next frame in the bit stream;

means for inserting an idle frame into the next frame when the predetermined number of frames have occurred and the time stamp is not detected; and means for replacing idle frames in the bit stream with data packets from a second data source thereby forming a multiplexed bit stream and guaranteeing the second source a guaranteed portion of the multiplexed bit stream.

25. A system according to claim 24 including means for inserting the idle frame after the next frame when the next frame contains the time stamp.

26. A system according to claim 24 including:

means for modulating the multiplexed bit stream onto a channel;

means for transmitting the modulated bit stream on the cable television network to multiple cable modems at remote subscriber locations;

means for demodulating the modulated bit stream at the subscriber locations; and means for sending the demodulated bit stream from the first source and demodulated data packets from the second source to an endpoint.

27. A system for combining bit streams from different sources onto a common channel, comprising:

a circuit having a first input receiving a first bit stream from a first data source with a selectable guaranteed minimum percentage of idles, a second input receiving data from a second source, and an output generating a multiplexed bit stream from the first and second source onto a common channel on a cable network, the circuit monitoring the first bit stream and enabling the insertion of data from the second source over idles detected in the first bit stream, the selectable minimum percentage of idles in the first bit stream providing the second source with a guaranteed minimum bandwidth for broadcasting data on the channel.

28. A system according to claim 27 wherein the multiplexed bit stream is formatted into MPEG frames.

29. A system according to claim 27 wherein the first source comprises a head end and the second source comprises an MPEG data source each broadcasting over a cable network.

30. A system according to claim 29 wherein the cable network includes a cable link broadcasting the multiplexed bit stream to multiple cable modems at remote subscriber locations.

31. A system according to claim 27 wherein the first bit stream includes MPEG time stamps, data packets and idles, the idles inserted at predetermined minimum time periods when no time stamps exist in the first bit stream or when there are no data packets available from the first source and no time stamps exist in the first bit stream.

32. A system according to claim 27 wherein the circuit inserts the selectable minimum percentage of idles into the first bit stream.

33. A circuit according to claim 32 wherein the circuit counts frames in the first bit stream, initiating the insertion of a predetermined number of idles in the first bit stream according to the number of counted frames, and prevents inserting idles whenever time stamps occur in the first bit stream.

34. A circuit according to claim 27 including a register for loading a selectable number of idles into the circuit.

35. A circuit according to claim 27 wherein the circuit modulates the multiplexed bit stream onto the channel and transmits the modulated bit stream on a cable television network to multiple cable modems at remote subscriber locations, the modulated bit stream demodulated one of the subscriber locations and the demodulated bit stream from the first source and the demodulated bit stream from the second source sent to an endpoint.

36. A cable modem, comprising:

a circuit for receiving a multiplexed bit stream on a common channel on a cable network, the multiplexed bit stream having a first bit stream from a first data source with a selectable guaranteed minimum percentage of idles and data from a second source, data from the second source inserted over idles detected in the first bit stream and the selectable minimum percentage of idles in the first bit stream providing the second source with a guaranteed minimum bandwidth for broadcasting data on the cable network.

37. A cable modem according to claim 36 wherein the multiplexed bit stream is modulated onto a TV channel.

38. A cable modem according to claim 37 wherein the modulated bit stream is demodulated by the circuit and the demodulated bit stream from the first source and the demodulated data from the second source sent to a computer.

39. A cable modem according to claim 38 wherein the modulated bit stream is transmitted on the cable television network to multiple cable modems at different remote subscriber locations.

* * * * *

UNITED STATES PATENT AND TRADEMARK OFFICE
CERTIFICATE OF CORRECTION

PATENT NO.     : 6,466,592 B1
DATED          : October 15, 2002
INVENTOR(S)    : Chapman It is certified that error appears in the above-identified patent and that said Letters Patent is hereby corrected as shown below:

Column 7,
Line 62, "in t first" should read -- in the first --.

Signed and Sealed this

Twenty-fifth Day of March, 2003

JAMES E. ROGAN
*Director of the United States Patent and Trademark Office*